United States Patent [19]
Matsumura et al.

[11] Patent Number: 5,549,169
[45] Date of Patent: * Aug. 27, 1996

[54] SCREW TIGHTENING APPARATUS

[75] Inventors: Masafumi Matsumura, Kariya; Junichiro Kanamori, Nisshin, both of Japan

[73] Assignee: Nippondenso Co., Ltd., Kariya, Japan

[ * ] Notice: The term of this patent shall not extend beyond the expiration date of Pat. No. 5,469,924.

[21] Appl. No.: 348,999

[22] Filed: Nov. 29, 1994

Related U.S. Application Data

[63] Continuation-in-part of Ser. No. 181,079, Jan. 13, 1994, Pat. No. 5,469,924.

[30] Foreign Application Priority Data

| Jan. 13, 1993 | [JP] | Japan | 5-4037 |
| Jan. 13, 1993 | [JP] | Japan | 5-4051 |
| Jan. 13, 1994 | [JP] | Japan | 6-001837 |

[51] Int. Cl.$^6$ .................. B23Q 5/00; E21C 5/00
[52] U.S. Cl. ..................... 173/176; 29/407.02
[58] Field of Search .................. 173/4, 5, 176, 173/2, 11; 29/407

[56] References Cited

U.S. PATENT DOCUMENTS

| 4,908,926 | 3/1990 | Takeshima et al. | 29/407 |
| 5,215,270 | 6/1993 | Udocon et al. | 29/407 |

FOREIGN PATENT DOCUMENTS

| 64-11740 | 1/1989 | Japan . | |
| 3-10728 | 1/1991 | Japan | 173/176 |
| 3202236 | 9/1991 | Japan . | |
| 4-115834 | 4/1992 | Japan | 173/176 |
| 4-141332 | 5/1992 | Japan | 173/176 |

OTHER PUBLICATIONS

Journal of Nippondenso Engineering Society, vol. 37 No. 2 1993 "Screw Tightening Apparatus" pp. 59 and 60.

Primary Examiner—Hwei-Siu Payer
Attorney, Agent, or Firm—Cushman, Darby & Cushman

[57] ABSTRACT

A screw tightening apparatus including an electric screwdriver having a bit shaft adapted to hold a male screw to be threaded to a female hole in a workpiece and a drive mechanism arranged to move the screwdriver toward and away from the mounting hole of the workpiece is disclosed. The screwdriver and drive mechanism are controlled in such a manner that the bit shaft is driven at a low speed and applied with a small thrust force at an initial stage during which the male screw is located to be engaged with the mounting hole. Then the bit shaft is driven at a higher speed than that at the initial stage and applied with a larger thrust force than that at the initial stage during an interim stage when the male screw is threaded into the mounting hole. Finally, the speed of the bit shaft is reduced so that the bit shaft is driven at a lower speed than that at the initial stage and applied with a larger thrust force than that at the interim stage at a final stage during which the male screw is tightened and seated on the workpiece.

14 Claims, 12 Drawing Sheets

SCREW TIGHTENING APPARATUS

CROSS REFERENCE TO RELATED APPLICATIONS

This application is a continuation-in-part of U.S. application Ser. No. 181,079 filed Jan. 13, 1994, entitled SCREW TIGHTENING APPARATUS by KANAMORI et al. now U.S. Pat. No. 5,469,924. This application is based upon and claims priority from Japanese Patent Applications No. 5-4037, 5-4051, both filed Jan. 13, 1993, and 6-1837 filed Jan. 13, 1994, with the contents of each Japanese document as well as the U.S. application being incorporated herein by reference.

BACKGROUND OF THE INVENTION

1. Field of the Invention

The present invention relates to an apparatus for automatically tightening various kinds of male screws into the corresponding mounting holes formed in a workpiece.

2. Related Art

For automation of screw tightening processes in recent years, it is required to provide technology for tightening at high speed various kinds of male screws into female screw holes formed in a workpiece and for decreasing the defect rate in the tightening of the male screws. In a conventional screw tightening apparatus, for example, an electric screwdriver is arranged to be moved by a pneumatic cylinder in a vertical direction, and an electric motor of the screwdriver is arranged to be supplied with electric current from an electric power source in response to an electric signal to start screw tightening. In operation, the screwdriver is moved downward by operation of the pneumatic cylinder, and the bit shaft of the screwdriver is driven by the electric motor to tighten a male screw into the corresponding female screw hole with a predetermined torque.

In the conventional screw tightening apparatus, however, vertical movement of the screwdriver may not be controlled in an appropriate manner. For this reason, it is a distinct possibility that the opening end of the female screw hole is damaged by abutment with the male screw to cause abnormal engagement therewith. Since the bit shaft of the screwdriver is driven at a constant speed, the working time for screw tightening is inevitably prolonged if the rotation speed of the screwdriver is decreased to reduce the defect rate of screw tightening. If the rotation speed of the screw driver is increased to shorten the working time for screw tightening, the occurrence of abnormal engagement of the male screw with the female screw hole will increase, and the accuracy in torque applied to the male screw may not be stabilized due to inertia of the screwdriver caused by increases of rotation speed of the electric motor.

To overcome the foregoing problems, it has been proposed in Japanese Patent Laid-open Publication No. 64-11740 to change the rotation speed of the screwdriver under control of a timer for conducting initial tightening at a high speed and final tightening at a low speed. In such control of the screwdriver, however, the tightening speed of the male screw may not be controlled in accordance with the tightening condition of the male screw. It is, therefore, difficult to detect the start of engagement with the female screw hole. If the bit shaft of the screwdriver started to rotate at a high speed before the male screw is brought into engagement with the female screw hole, normal engagement of the male screw would not be expected, resulting in a defect of screw tightening. In the case that the rotation speed of the screwdriver is controlled in accordance with engagement of the male screw with the female screw hole without proper control of thrust force acting on the bit shaft, there will occur a defect in the screw tightening.

In Japanese Patent Laid-open Publication No. 3-202236, it has been proposed to detect initial engagement of the male screw with the female screw hole on a basis of an input current applied to the electric motor of the screwdriver for controlling the rotation speed of the bit shaft. The input current of the electric motor is, however, increased at a time when the male screw is brought into engagement with the female screw hole of the workpiece. This means that the timing for increasing the input current does not correspond with initial engagement of the male screw with the female screw hole. It is, therefore, apparent that if the bit shaft of the screwdriver was driven at a high speed in spite of poor engagement of the male screw with the female screw hole, there will occur defective screw tightening.

For the purpose of overcoming the problems mentioned above, the inventors have found that the following facts are required for shortening the screw tightening time and for decreasing the defect rate of screw tightening.

1) Finishing the screw tightening in a short time.

2) Avoiding the occurrence of defective screw tightening, which causes chafing of the male screw in engagement with the female screw hole, crushes the screw head, or allows free rotation of the male screw by stripping the threads or the like.

3) Detecting the occurrence of defective screw tightening.

4) Correcting a teaching point to avoid defective screw tightening.

In case the rotation speed of the bit shaft is increased to shorten the screw tightening time, there will occur defects of screw tightening such as chafing of the male screw in initial engagement with the female screw hole, decrease of accuracy in torque control, damage of the male screw head or the like. To avoid such problems, the inventors have specifically analyzed the above phenomena and found that during screw tightening, if time can be shortened without any defective screw tightening, the rotation speed of the bit shaft is decreased at initial engagement of the male screw and prior to increase of tightening torque and is increased at the other occasion.

Furthermore, defective screw tightening is caused by various phenomena such as poor engagement of the bit shaft with the male screw, crushing of the male screw head or the female screw hole or the like. These phenomena will occur if an advance force applied to the male screw is inappropriate in tightening into the female screw hole. As a result of analysis of the phenomena, it has been found that the thrust force acting on the male screw head must be controlled to be 20–30% of the tightening torque without causing disengagement of the bit shaft from the male screw head. If the male screw is applied with an excessive thrust force before it is brought into engagement with the female screw hole, the female screw hole will be damaged or stuck in engagement with the male screw. Accordingly, it is desirable that the thrust force of the bit shaft is controlled in accordance with the following steps of:

1) advancing the male screw to bring into engagement with the female screw hole, 2) seating the male screw on the workpiece after engagement with the female screw hole, and 3) increasing the tightening torque of the screwdriver after the male screw was seated on the workpiece.

For such control of the thrust force, it is necessary to detect a tightening condition of the male screw. Since the tightening torque changes only in slight amount before and after engagement with the female screw hole, it is impossible to detect the start of engagement of the male screw with the female screw hole by the torque or rotational position of the bit shaft. It is, however, apparent that the distal end of the bit shaft is placed in the same position if the male screw freely rotates when advanced by engagement with the bit shaft. When the male screw is brought into engagement with the female screw hole, the bit shaft is advanced by the pitch of the male screw thread. Accordingly, the start of engagement with the female screw hole can be detected by movement of the bit shaft. Since the torque of the bit shaft increases when the male screw is seated on the workpiece, the seating of the male screw can be detected by change of the torque of the bit shaft. However, the accuracy of detection of the seating may not be ensured under high speed rotation of the bit shaft. It is, therefore, necessary to decrease the rotation speed of the bit shaft prior to seating of the male screw. For control of the rotation speed of the bit shaft, the seating time of the male screw can be estimated on a basis of the initial engagement time of the male screw, the rotation speed of the bit shaft and the pitch of the male screw thread.

SUMMARY OF THE INVENTION

It is, therefore, a primary object of the present invention to provide a screw tightening apparatus capable of securely tightening a male screw into a mounting hole of a workpiece in a short time without causing any of the problems discussed above.

According to the present invention, the object is accomplished by providing a screw tightening apparatus of the type including an electric screwdriver the bit shaft of which is arranged to carry a male screw engaged therewith to be threaded into a mounting hole of a workpiece and a drive mechanism arranged to move the screwdriver toward and away from the mounting hole of the workpiece and to apply a thrust force to the bit shaft of the screwdriver. An electric control system for the screw tightening apparatus comprises first control means for controlling operation of the screwdriver and drive mechanism in such a manner that the bit shaft is driven at a low speed and applied with a small thrust force at an initial stage during which the male screw is located to be brought into engagement with the mounting hole of the workpiece, second control means for controlling operation of the screwdriver and drive mechanism in such a manner that the bit shaft is driven at a higher speed than that at the initial stage and applied with a larger thrust force than that at the initial stage at an interim stage during which the male screw is threaded into the mounting hole of the workpiece, and third control means for controlling operation of the screwdriver and drive mechanism in such a manner that the bit shaft is driven at a lower speed than that at the initial stage and applied with a larger thrust force than that at the interim stage at a final stage during which the male screw is tightened and seated on the workpiece.

In a practical embodiment of the present invention, it is preferable that the screw tightening apparatus further comprises means for calculating an amount of downward movement of the bit shaft caused by operation of the drive mechanism in a time period during which the male screw is tightened and seated on the workpiece after engagement with the mounting hole and means for determining whether the amount of downward movement of the bit shaft is in a predetermined amount defined by upper and lower target limit values and for determining the fact that the male screw has been properly tightened when the amount of downward movement of the bit shaft is in the predetermined amount.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PRESENTLY PREFERRED EXEMPLARY EMBODIMENT

Figure 1:
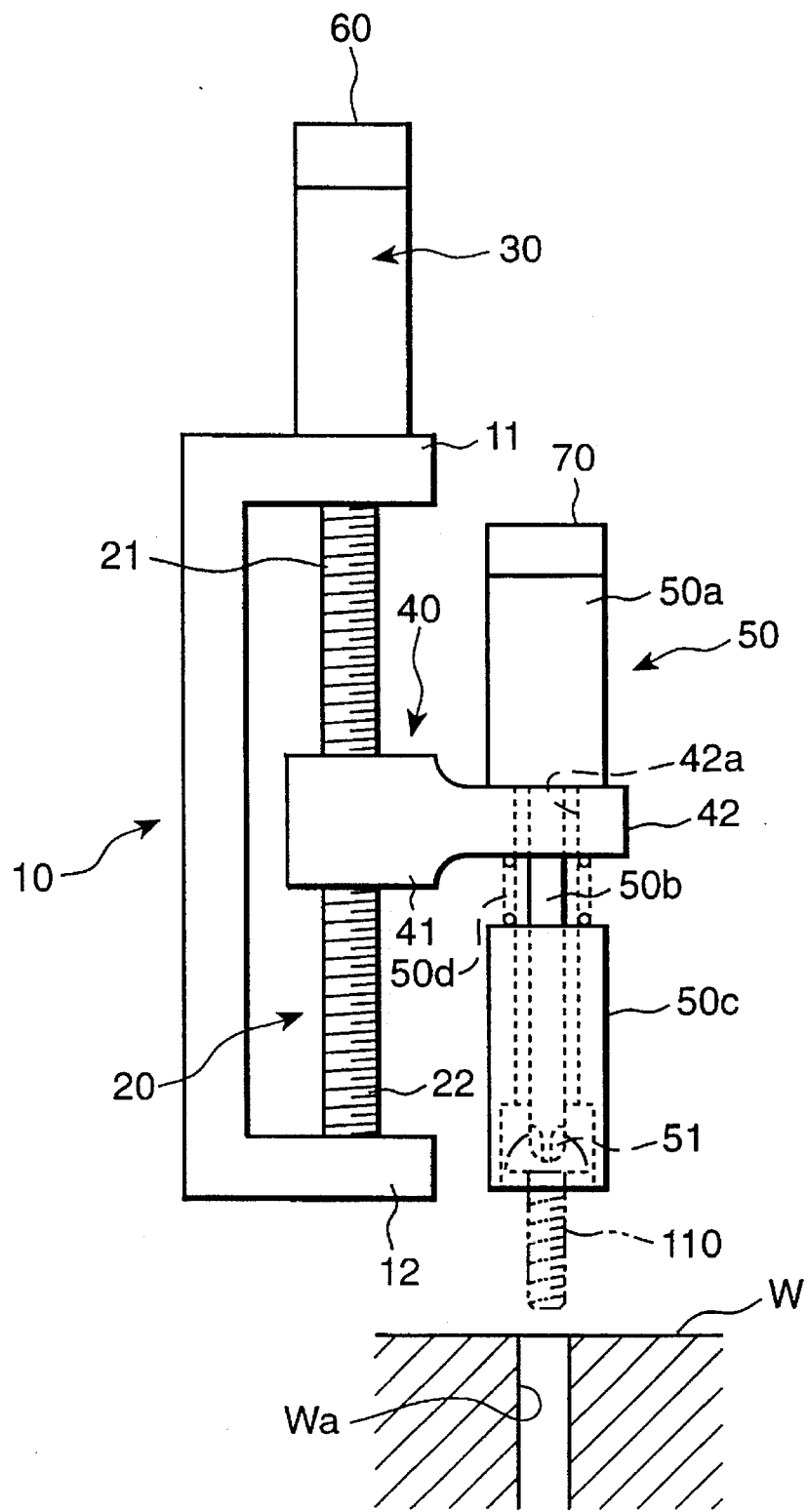
FIG. 1 is a schematic illustration of a screw tightening apparatus.

Referring now to the drawings, FIG. 1 schematically illustrates a screw tightening apparatus which includes an upright support structure 10 mounted on a stationary frame (not shown) and a vertical feed screw shaft 20 rotatably supported by an upper arm 11 of support structure 10 at its upper end portion 21 and by a lower arm 12 of support structure 10 at its lower end portion 22. A direct current servomotor 30 is mounted on the upper arm 11 of support structure 10 coaxially with the feed screw shaft 20 and is drivingly connected to the upper end of screw shaft 20. A movable support member 40 has a body portion 41 engaged with the feed screw shaft 20 at its female screw hole for vertical movement. An electric screwdriver 50 is mounted on an arm portion 42 of movable support member 40, which includes a direct current servomotor 50a mounted on the arm portion 42 of movable support member 40 coaxially with a through hole 42a and a bit shaft 50b drivingly connected at its base end to the servomotor 50a. The bit shaft 50b is arranged in parallel with the feed screw shaft 20 to be driven by the servomotor 50a. A movable catcher 50c is coaxially assembled with the bit shaft 50b and carried by the arm portion 42 of movable support member 40 by means of a coil spring 50d.

Figure 2:
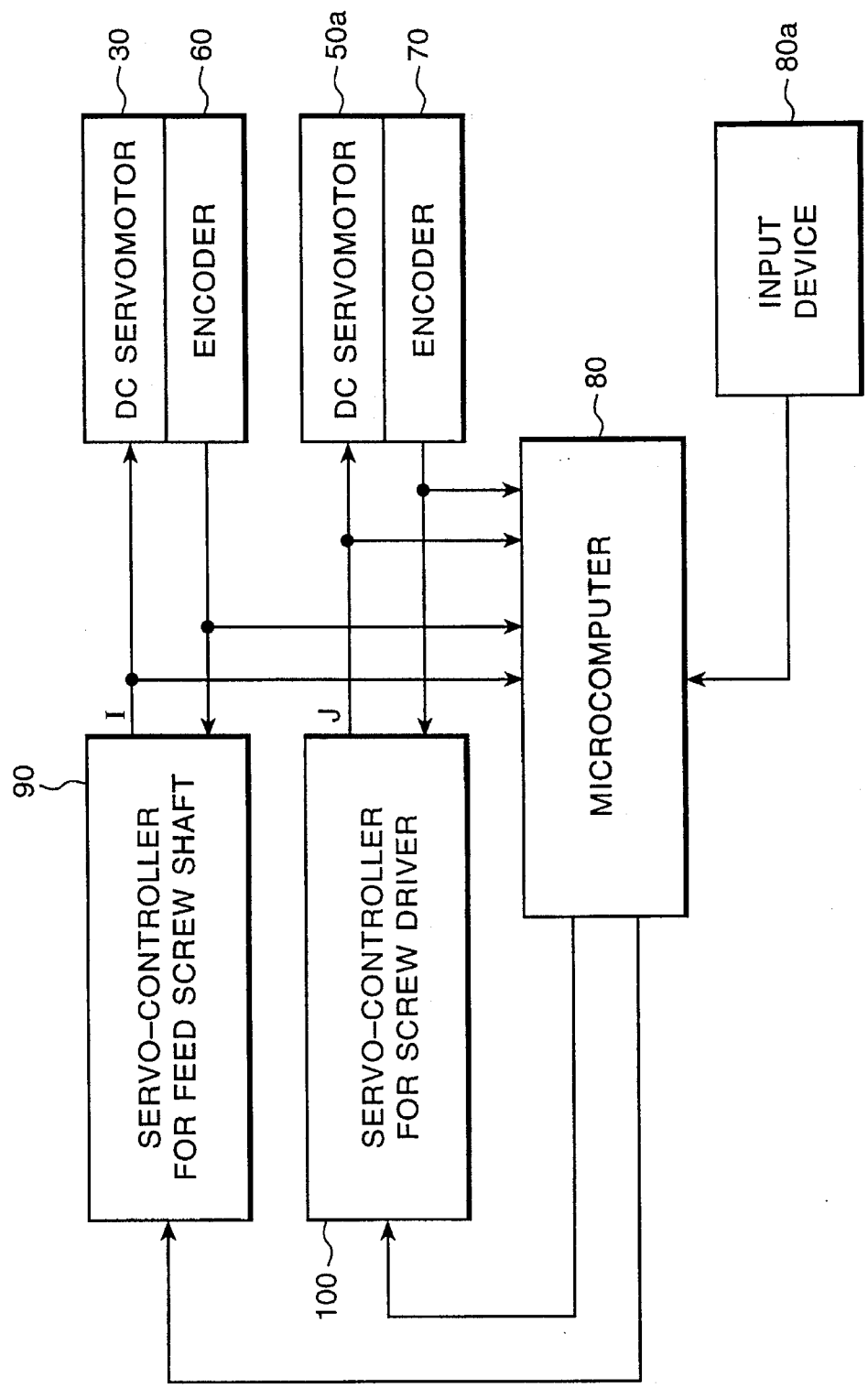
FIG. 2 is a block diagram of an electric control system for the screw tightening apparatus shown in FIG. 1.

As shown in FIGS. 1 and 2, an electric control system of the screw tightening apparatus includes an encoder 60 of the rotary type coaxially mounted on the servomotor 30 to measure a rotation amount of servomotor 30 for producing an output signal indicative of a rotation amount of feed screw shaft 20. In this case, the rotation amount of feed screw shaft 20 represents a downward movement amount of the distal end 51 of bit shaft 50b from its upward stroke end. In this embodiment, when the rotation amount of feed screw shaft 20 is zero, the movement amount of bit shaft 50b is represented as zero. An encoder 70 of the rotary type is coaxially mounted on the servomotor 50a to measure a rotation amount of servomotor 50a for producing an output signal indicative of a rotation amount of the bit shaft 50b.

The electric control system includes a microcomputer 80 which cooperates with the encoders 60, 70, input device 80a, and servo-controllers 90 and 100 to execute a control program shown by flow charts in FIGS. 5–9. During execution of the control program, the computer 80 calculates data necessary for control of the servo-controllers 90 and 100. The computer 80 includes a read-only memory or ROM for preliminarily memorizing the control program and data shown in the following Table 1.

TABLE 1

Figure 3:
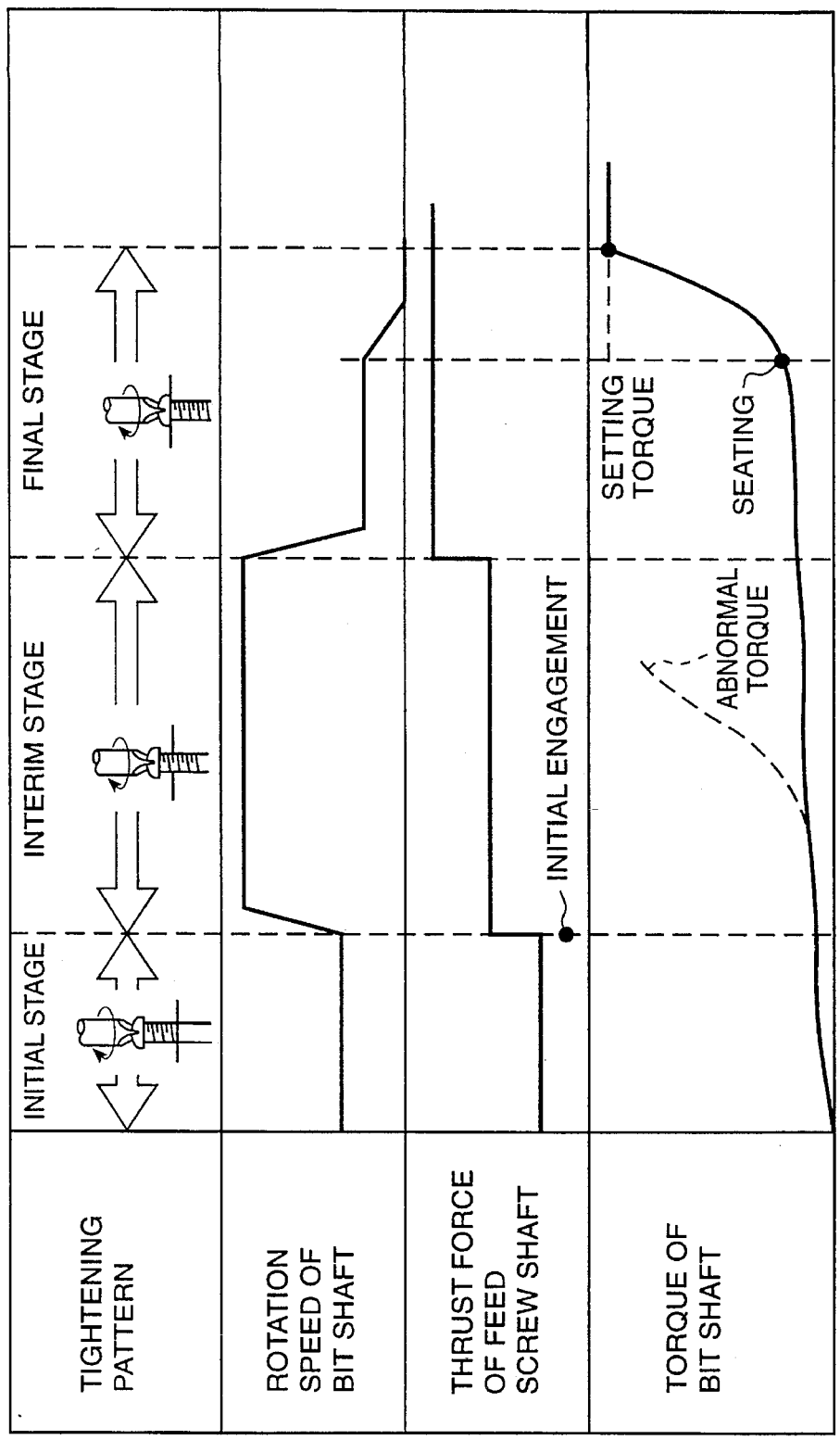
FIG. 3 is a chart showing rotation speed and torque of a bit shaft and a thrust force acting on the bit shaft in relation to a tightening pattern of a male screw.

First thrust force of the screw shaft
Second thrust force of the screw shaft
Third thrust force of the screw shaft
First rotation speed of the bit shaft
Second rotation speed of the bit shaft
Third rotation speed of the bit shaft
Length and pitch of a male screw
Rotation amount prior to seating
Rotation extent of abnormal engagement
Abnormal torque
Setting torque
Predetermined rotation amount The data of Table 1 is determined in such a manner as described below. As shown in FIG. 3, the rotation speed of the bit shaft, the thrust force of the feed screw shaft and the torque of the bit shaft are determined in relation to a tightening pattern of the male screw. At an initial stage of the tightening pattern, the male screw 110 is located to be brought into engagement with the female screw hole Wa of workpiece W. At an interim stage of the tightening pattern, the male screw 110 is threaded into the female screw hole Wa of workpiece W to be seated on the workpiece W at its head portion. At a final stage of the tightening pattern, the male screw 110 is tightened and seated on the workpiece W at its head portion.

The thrust force of the feed screw shaft 20 represents a thrust force acting on the electric screwdriver 50 for vertical movement and corresponds with a thrust force acting on the head portion of male screw 110 at the distal end of bit shaft 50b. As shown in FIG. 3, the thrust force of the feed screw shaft 20 is determined as the first, second and third thrust forces in accordance with the respective stages of the tightening pattern for optimal adjustment. In this case, the first thrust force is determined as a small value to securely bring the male screw 110 into engagement with the female screw hole Wa without causing any inclination thereto. The second thrust force is determined to be larger than the first thrust force for threading the male screw 110 into the female screw hole Wa without causing any inclination thereto. The third thrust force is determined to be larger than the second thrust force for firmly tightening the male screw 110 without crushing the head portion thereof.

As shown in FIG. 3, the rotation speed of the bit shaft is determined as the first, second and third rotation speeds in accordance with the respective stages of the tightening pattern. In this case, the first rotation speed is determined as a low speed to securely bring the male screw 110 into engagement with the female screw hole Wa, the second rotation speed is determined to be higher than the first rotation speed for shortening the screw tightening time, and the third rotation speed is determined to be lower than the first rotation speed for tightening the male screw with a stable torque. The abnormal torque represents an excessive torque applied to the bit shaft at the interim stage of the tightening pattern as shown by a broken line in FIG. 3. For instance, the abnormal torque is caused by abnormal engagement of the male screw 110 with the female screw hole Wa. The setting torque represents a maximum torque applied to the male screw 110 at the final stage of the tightening pattern. The length of the male screw 110 represents a length of the threaded portion of the male screw 110. The rotation amount prior to seating represents a rotation amount of the bit shaft 50b to be applied before the male screw 110 is seated on the workpiece W at its head portion. The rotational extent of abnormal engagement represents an extent of rotation amount of the bit shaft in the occurrence of abnormal engagement of the male screw with the female screw hole.

Figure 4A:
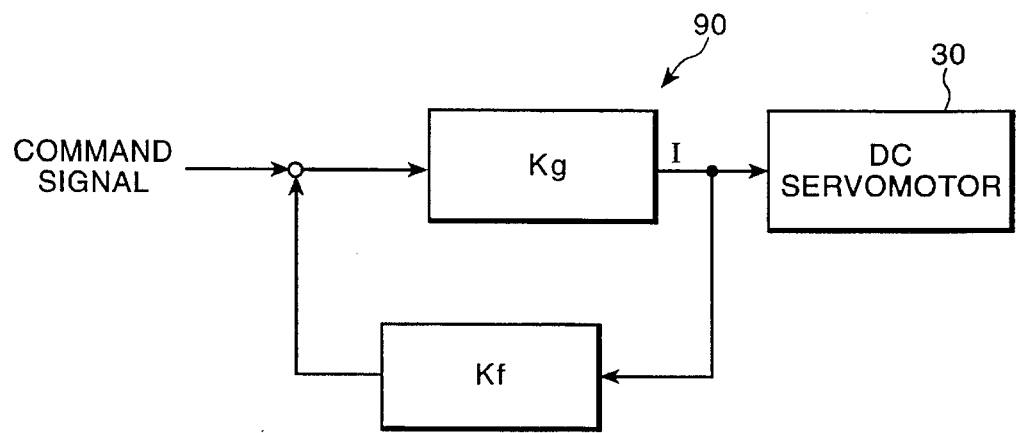
FIG. 4(A) is a circuit diagram of a servo-controller for driving a vertical feed screw shaft shown in FIG. 1.
Figure 4B:
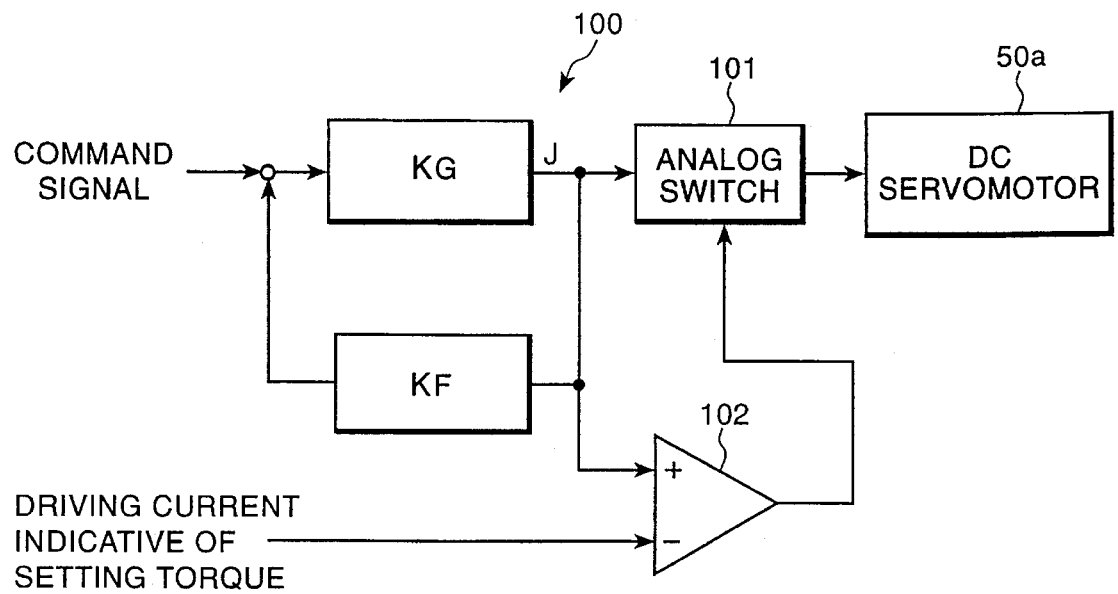
FIG. 4(B) is a circuit diagram of a servo-controller for driving the bit shaft shown in FIG. 1.
Figure 5:
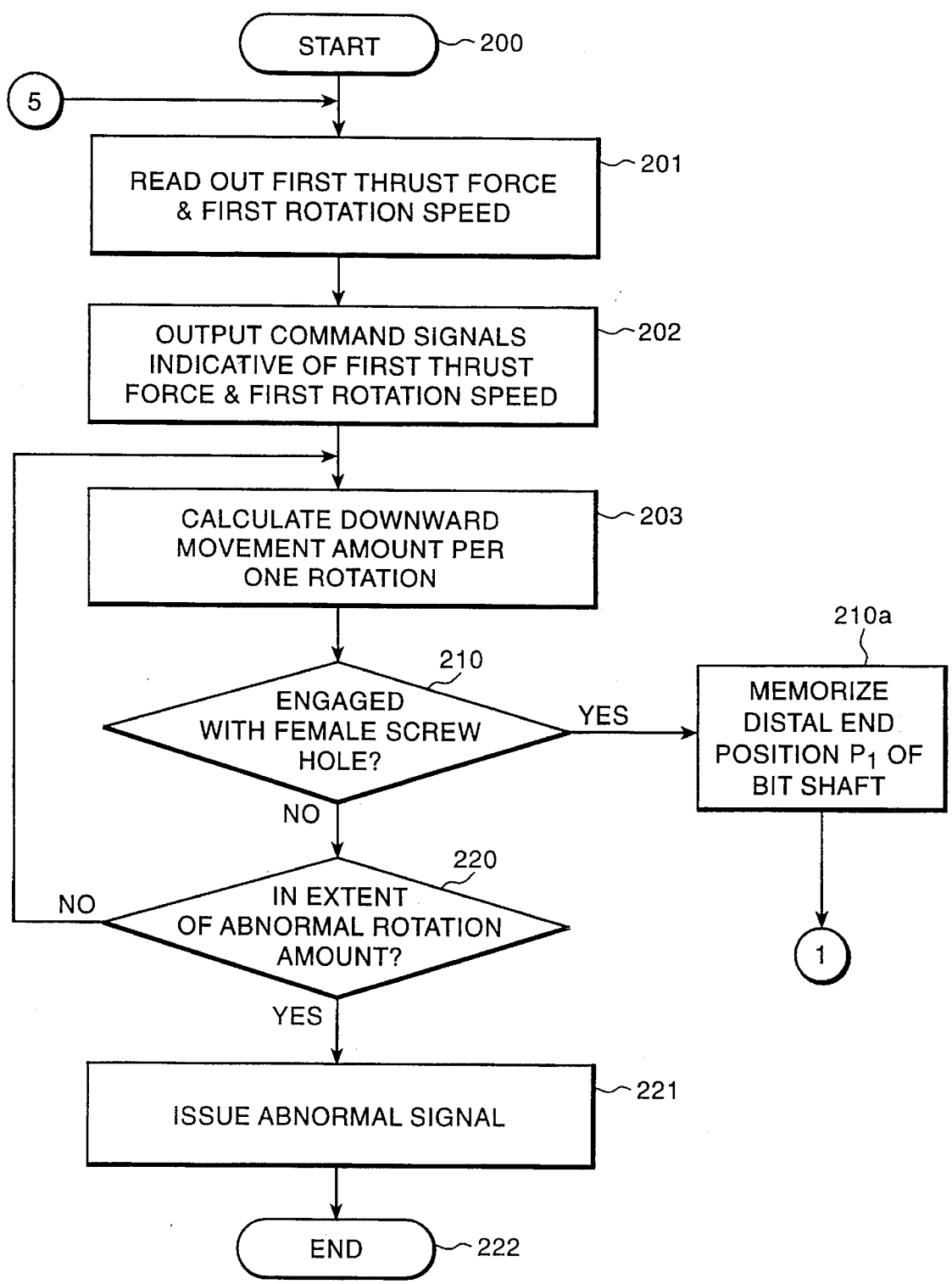
FIGS. 5–9 illustrate a control program executed by a microcomputer shown in FIG. 2.
Figure 6:
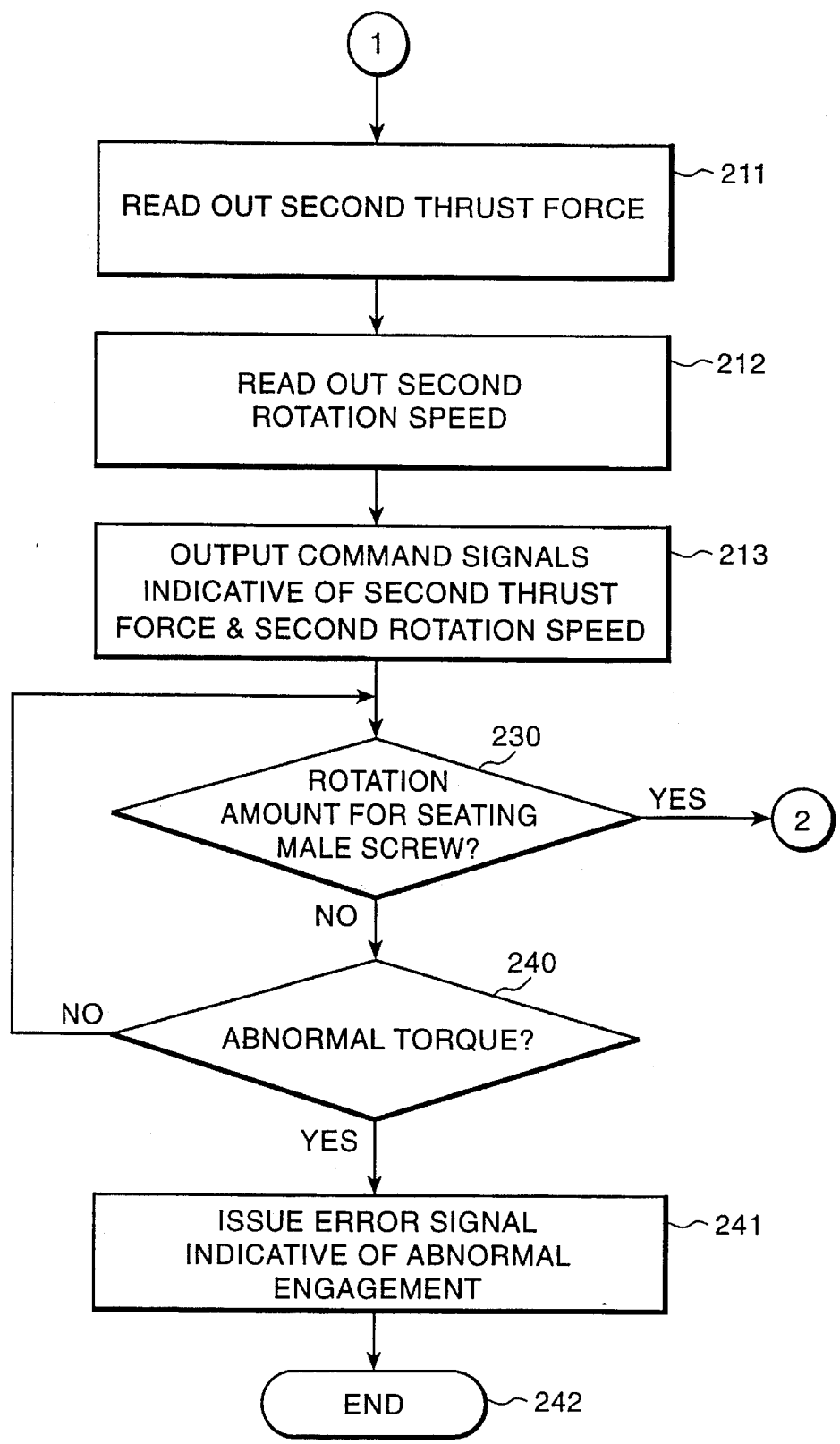
Figure 7:
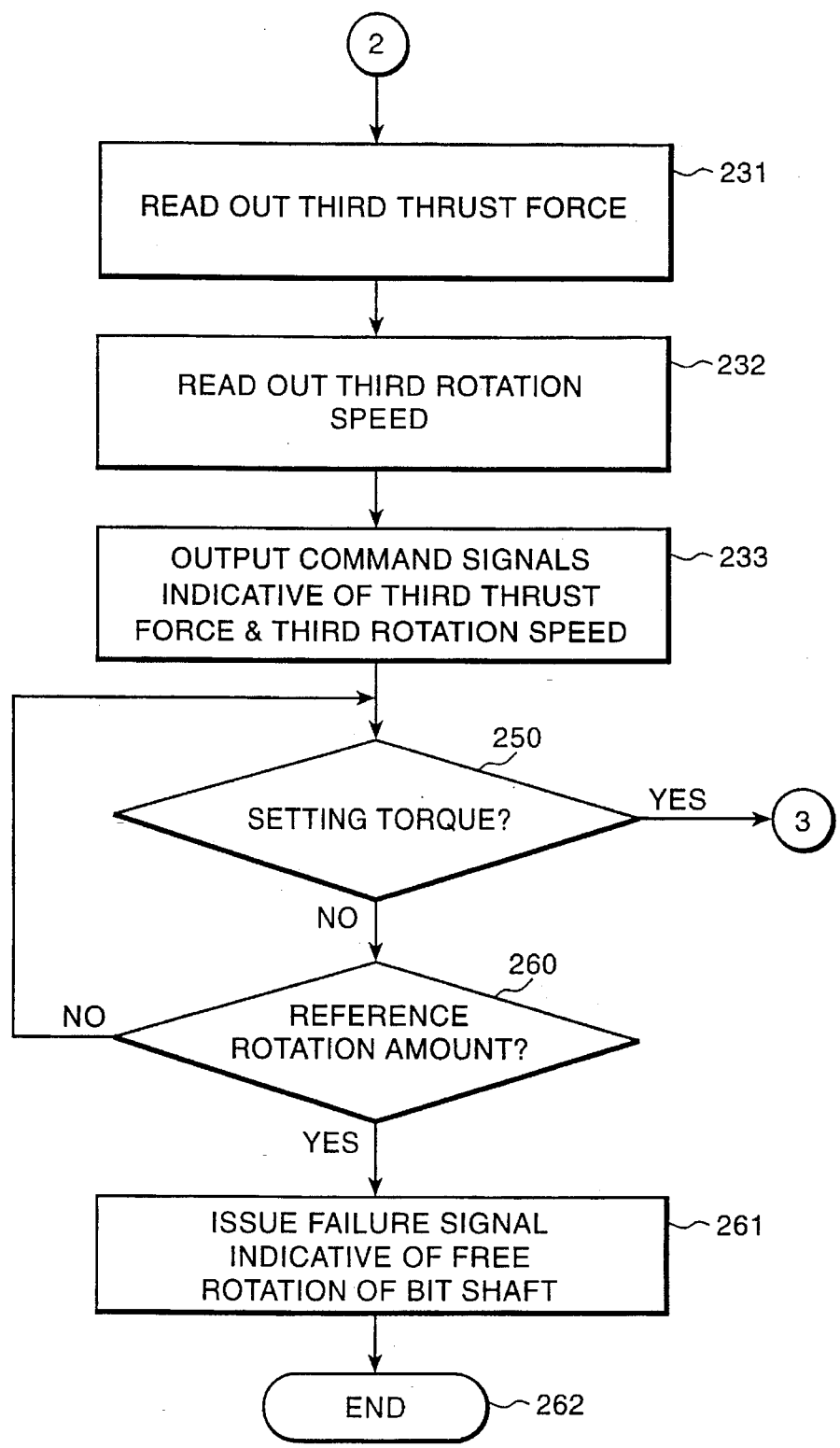
Figure 8:
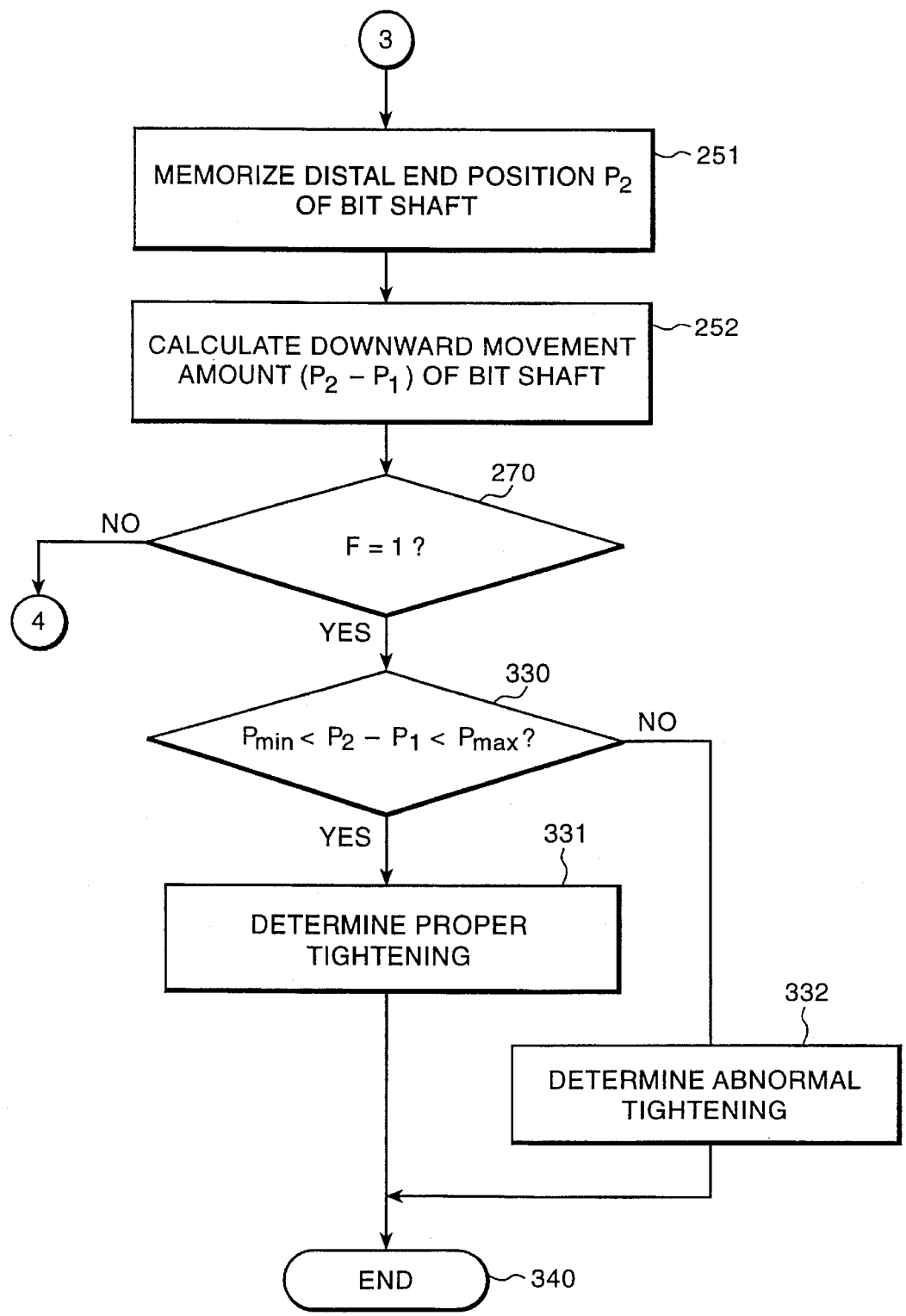
Figure 9:
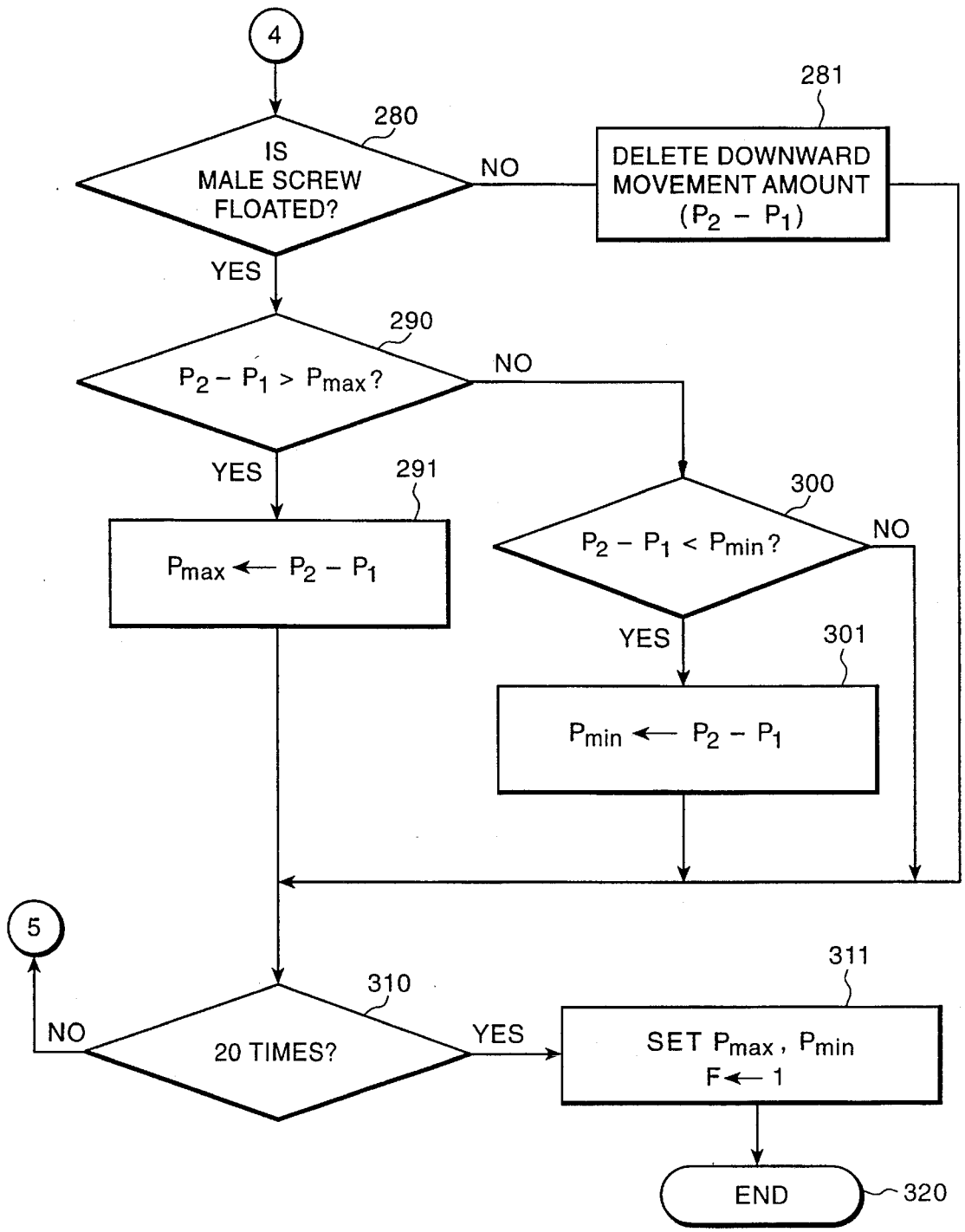

The computer 80 is connected to an input device 80a which is arranged to be operated by an operator when he recognized a float condition of the male screw 110 threaded into the female screw hole Wa. The input device 80a produces an error signal when operated by the operator and applies it to the computer 80. When applied with a command signal for effecting thrust of the feed screw shaft form the computer 80 as shown in FIG. 4(A), the servo-controller 90 adds the memorized thrust force to a feedback value of a driving current I multiplied by a gain Kf and multiplies a resultant of the addition by a gain Kg to apply a resultant of the multiplication as the driving current I to the servomotor 30. When applied with the command signal for effecting thrust of the feed screw shaft from the computer 80 as shown in FIG. 4 (B), the servo-controller 100 adds the memorized thrust force to a feedback value of a driving current J multiplied by a gain Kf and multiplies a resultant of the addition by a gain Kg to apply a resultant of the multiplication as the driving current J to the servomotor 50a through an analog switch 101.

The analog switch 101 is arranged to be opened in response to a high level signal applied form a comparator 102 and closed in response to a low level signal applied from the comparator 102. Thus, the servomotor 50a is applied with the driving current J only when the analog switch 101 is being closed. The comparator 102 is arranged to compare the feedback value of driving current J with a driving current of the bit shaft corresponding with the memorized setting torque applied from the computer 80. When the feedback value of driving current J is smaller than the driving current of the bit shaft, the comparator 102 proceeds a low level signal therefrom and applies it to the analog switch 101. When the feedback value of driving current J becomes larger than the driving current of the bit shaft, the comparator 102 produces a high level signal therefrom and applies it to the analog switch 101.

Assuming that the male screw 110 has been supplied to the catcher 50c as shown in FIG. 1, the male screw 110 is carried by the catcher 50c and placed coaxially with the bit shaft 50b. In this case, the pitch of the male screw 110 is determined to be Pn. When the screw tightening apparatus is activated in such a condition as described above, the computer 80 starts to execute the control program at step 200 shown in FIG. 5. At the following step 201, the computer 80 reads out the first thrust force of the feed screw shaft and the first rotation speed of the bit shaft and causes the program to proceed to step 202. At step 202, the computer 80 applies first and second command signals respectively indicative of the first thrust force and the first rotation speed to the servo-controllers 90 and 100. In response to the first command signal, the servo-controller 90 produces a driving current I for generation of the first thrust force and applies it to the servomotor 30. Thus, the servomotor 30 operates to rotate the feed screw shaft 20 thereby to apply the first thrust force to the electric screwdriver 50 for downward movement. In response to the second command signal, the servo-controller 100 produces a driving current J for rotating the bit shaft at the first rotation speed and applies it to the servomotor 50a. Thus, the servomotor 50a operates to rotate the bit shaft 50b at the first rotation speed and the male screw 110 rotates similarly. The bit shaft 50b moves downward while rotating at the first rotation speed, and then downward movement of the electric screwdriver 50 stops and the servomotor 30 receives a reaction force. Consequently, a contact judgement is performed by current value so that the shaft driving force does not become too large.

Thrust force for moving downward is set to a value such that the tip of male screw 110 does not crush the upper end surface of the female screw hole Wa when the tip of male screw 110 contacts the upper end surface of the female screw hole Wa. The computer 80 controls the thrust force and the electric screwdriver 50 moves downward while rotating at the first rotation speed and with the first thrust force.

After processing at step 202, the computer 80 is applied with input signals from the encoders 60 and 70 at step 203 to subtract a rotation amount of the feed screw shaft 20 from a rotation amount of the bit shaft 50b for calculating an amount of downward movement of the bit shaft 50b per one rotation. At the following step 210, the computer 80 compares the amount of downward movement of the bit shaft 50b with the pitch of the male screw 110. Assuming that the male screw 110 is located to be brought into engagement with the female screw hole Wa, the amount of downward movement of the bit shaft 50b is maintained to be larger than the pitch of male screw 110. When the male screw 110 is pressed onto the female screw hole Wa, the amount of downward movement of the male screw 110 is maintained without any change. When the male screw 110 is properly engaged with the female screw hole Wa, the amount of downward movement of the bit shaft 50b becomes equal to the pitch of male screw 110 since the advance amount of the bit shaft 50b is defined by the pitch of male screw 110.

Thus, the computer 80 determines a "Yes" answer at step 210 when the amount of downward movement of the bit shaft 50b becomes equal to the pitch of male screw 110. In this instance, the male screw 110 is brought into engagement with the female screw hole Wa without causing any inclination thereto under control of the thrust force of the feed screw shaft 20 and the rotation speed of the bit shaft 50a. If the computer 80 determines a "No" answer at step 210, the program proceeds to step 220 where the computer 80 determines whether or not the rotation amount of the bit shaft 50b is in the extent of abnormal rotation amount. If the answer at step 220 is "Yes", the program proceeds to step 221 where the computer 80 issues an abnormal signal indicative of abnormal engagement of the male screw 110 and applies it to the servo-controllers 90 and 100, respectively. Thus, at the following step 222, the computer 80 terminated the processing for tightening the male screw 110. When applied with the abnormal signal form the computer 80, the servo-controllers 90 and 100 ceases production of the driving currents to deactivate the servomotors 30 and 50a. If the answer at step 220 is "No", the computer 80 returns the program to step 203 for processing at step 210.

When the "Yes" answer is determined at step 210, the program proceds to step 210a where the computer 80 determines the position of the distal end 51 of bit shaft 50b based on the rotation amount data applied from the encoder 60 and memorizes it as a distal end position P1. Subsequently, the computer 80 reads out the memorized second thrust force of the feed screw shaft 20 at step 211 and the memorized second rotation speed of the bit shaft 50b at step 212. At the following step 213, the computer 80 applies third and fourth command signals respectively indicative of the second thrust force and the second rotation speed to the servo-controllers 90 and 100. In response to the third command signal, the servo-controller 90 produces a driving current I for generation of the second thrust force and applies it to the servomotor 30. Thus, the servomotor 30 operates to rotate the feed screw shaft 20 thereby to apply the second thrust force to the electric screwdriver 50 for downward movement. In response to the fourth command signal, the servo-controller 100 produces a driving current J for rotating the bit shaft 50b at the second rotation speed and applies it to the servomotor 50a. Thus, the servomotor 50a operates to rotate the bit shaft 50b at the second rotation speed. This causes the male screw 110 to rotate at the second rotation speed and move down under the second thrust force. As a result, the male screw 110 is threaded into the female screw hole Wa in a short time without causing any inclination thereto.

After processing at step 213, the computer 80 determines at step 230 whether the rotation amount of the male screw 110 has become the rotation amount for seating the male screw 110 on the workpiece W. In this case, the rotation amount for seating the male screw 110 represents an advance amount (Pn-1) of the male screw into the female screw hole. Thus, the computer 80 calculates an advance amount of the male screw 110 into the female screw hole Wa based on the rotation amount data applied from the encoder 70 in relation to the memorized length and pitch of the male screw. When the advance amount of the male screw becomes equal to the rotation amount for seating the male screw 110 on the workpiece W, the computer 80 determines a "Yes" answer at step 230 and causes the program to proceed to step 231 shown in FIG. 7. If the answer at step 230 is "No", the program proceeds to step 240 where the computer 80 determines whether the torque of the bit shaft is normal or abnormal. If the engagement of the male screw with the female screw hole is in an abnormal condition, the torque of the bit shaft is excessively increased, resulting in an excessive increase of the driving current J for the bit shaft. If the driving current J for the bit shaft becomes larger than the abnormal current indicative of the abnormal torque, the computer 80 determines a "Yes" answer at step 240 and causes the program to proceed to step 241 where the computer 80 issues an error signal indicative of abnormal engagement of the male screw and applies it to the servo-controller 90 and 100. Thus, at the following step 242, the computer 80 terminates the processing for tightening the male screw. When applied with the error signal from the computer 80, the servo-controllers 90 and 100 cease production of the driving current to deactivate the servomotors 30 and 50a. If the answer at step 240 is "No", the computer 80 returns the program to step 230.

When the "Yes" answer is determined at step 230, the computer 80 reads out the memorized third thrust force of the feed screw shaft 20 at step 231 and the memorized third rotation speed of the bit shaft at step 232. At the following step 233, the computer 80 applies fifth and sixth command signals respectively indicative of the third thrust force and the third rotation speed to the servo-controllers 90 and 100. In response to the fifth command signal, the servo-controller 90 produces a driving current I for generation of the third thrust force and applies it to the servomotor 30. Thus, the servomotor 30 operates to rotate the feed screw shaft 20 thereby to apply the third thrust force to the electric screwdriver 50 for downward movement. In response to the sixth command signal, the servo-controller 100 produces a driving current J for rotating the bit shaft 50b at the third rotation speed and applies it to the servomotor 50a. Thus, the servomotor 50a operates to rotate the bit shaft 50b at the third rotation speed. This causes the male screw 110 to rotate at the third rotation speed and move down under the third thrust force. As a result, the male screw 110 is tightened into the female screw hole Wa and seated on the workpiece W at its head portion in a stable condition.

After processing at step 233, the computer 80 determines at the following step 250 whether the torque of the bit shaft 50b has become equal to the memorized setting torque or not. When the driving current corresponding with the torque of the bit shaft becomes equal to the driving current corresponding with the setting torque, the computer 80 determines a "Yes" answer at step 250 and causes the program to proceed to step 251 shown in FIG. 8. At step 251, the computer 80 determines the distal end 51 of bit shaft 50b based on the rotation amount data applied from the encoder 60 and memorizes it as a distal end position P2. At the following step 252, the computer 80 calculates an amount of downward movement of the bit shaft 50b based on a difference P2–P1 between the memorized distal end positions and memorizes the calculated amount of downward movement. Subsequently, the computer 80 determines at step 270 whether a flag F is "1" or not. In this case, the flag F represents the fact that upper and lower limit values Pmax and Pmin of the amount of downward movement (P2–P1) has been learned. If the answer at step 270 is "No", the computer 80 causes the program to proceed to step 280 shown in FIG. 9. If in this instance the operator recognized a float condition of the male screw 110 threaded into the female screw hole Wa, the input device 80a is operated by the operator to apply an error signal to the computer 80. Thus, the computer 80 determines a "No" answer at step 280 and deletes the memorized amount of downward movement (P2–P1) at step 281.

When the male screw 110 has been securely tightened into the female screw hole Wa without causing any float, the computer 80 determines a "Yes" answer at step 280 and causes the program to proceed to step 290. If at this stage the memorized amount of downward movement (P2–P1) is larger than the upper limit value Pmax, the computer 80 determines a "Yes" answer at step 290 and causes the program to proceed to step 291. At step 291, the computer 80 learns the memorized amount of downward movement (P2–P1) as the upper limit value Pmax and causes the program to proceed to step 310. If the answer at step 290 is "No", the program proceeds to step 300 where the computer 80 determines whether the memorized amount of downward movement (P2–P1) is smaller than the lower limit value Pmin. If the answer at step 300 is "Yes", the computer 80 learns at step 301 the memorized amount of downward movement (P2–P1) as the lower limit value Pmin and causes the program to proceed to step 310. If the answer at step 300 is "No", the computer 80 causes the program to proceed to step 310.

When the program proceeds to step 310 as described above, the computer 80 determines a "No" answer and returns the program to step 201 until the number of learning times at step 291 and 301 becomes 20 times. Thus, the computer 80 repeats the processing at step 201 to 310 for tightening a plurality of male screws into each female screw hole of plural workpieces. During the repetitive processing at step 201 to 310, the computer 80 determines a "Yes" answer at step 290 when a newly memorized amount of downward movement (P2–P1) is larger than the previously learned upper limit value Pmax and learns the newly memorized amount of downward movement (P2–P1) as the upper limit value Pmax at step 291. Similarly, the computer 80 determines a "Yes" answer at step 300 when the newly memorized amount of downward movement (P2–P1) is smaller than the previously learned lower limit value Pmin and learns the newly memorized amount of downward movement (P2–P1) as the lower limit value Pmin at step 301. When the number of learning times at step 291 and 301 becomes 20 times, the computer 80 determines a "Yes" answer at step 310 and causes the program to proceed to step 311. At step 311, the computer 80 determines the newly learned upper limit value Pmax as a final target upper limit value Pmax and determines the newly learned lower limit value Pmin as a final target lower limit value Pmin. At the same time, the computer 80 sets the flag F as "1" at step 311 and terminates the processing of the control program at step 320.

If the answer at step 250 is "No" during the repetitive processing at step 201 to 310, the program proceeds to step 260 where the computer 80 determines whether the rotation amount of the bit shaft 50b reaches the memorized reference rotation amount. In this case, the reference rotation amount is determined to be larger than the rotation amount of the bit shaft 50b corresponding with the pitch Pn of the male screw thread and to represent free rotation of the bit shaft 50b. If the answer at step 260 is "Yes", the program proceed to step 261 where the computer 80 produces a failure signal therefrom and applies it to the servo-controllers 90 and 100. Thus, the servo-controllers cease production of the driving current in response to the failure signal to deactivate the servomotors 30 and 50a, and the computer 80 terminates the processing for tightening the male screw at step 262.

Assuming that a fresh male screw 110 has been supplied to the catcher 50c after the final target limit values Pmax, Pmin and the flag F=1 were stored in a back-up memory of the computer 80, the computer 80 executes the processing at step 200 to 252 in the same manner as described above to calculate an amount of downward movement (P2–P1) of the bit shaft 50b. In this instance, the computer 80 determines a "Yes" answer at step 270 because of F=1 and determines at step 330 whether the newly calculated amount of downward movement (P2–P1) in larger than the final target lower limit value Pmin and smaller than the final target upper limit value Pmax. If the answer at step 330 is "Yes", the program proceeds to step 331 where the computer 80 determines the fact that the fresh male screw has been properly tightened into a female screw hole Wa of a fresh workpiece W. At step 331, the computer 80 produces a finish signal for terminating the processing for tightening the male screw and applies it to the servo-controllers 90 and 100. When applied with the finish signal from the computer 80, the servo-controller 90 ceases production of the driving current to deactivate the servomotor 30. In this instance, the feedback value of the driving current applied to the analog switch 101 becomes larger than the driving current corresponding with the setting torque. This causes the comparator 102 of servo-controller 100 to produce a high level signal therefrom. Thus, the analog switch 101 is opened in response to the high level signal from comparator 102 to interrupt the supply of the driving current to the servomotor 50a for deactivation thereof. As a result, the tightening of the male screw 110 is completed, and the computer 80 terminates the processing of the control program. If the answer at step 330 is "No", the program proceeds to step 332 where the computer 80 determines the fact that the male screw has been tightened into the female screw hole Wa in an abnormal condition and deactivates the servomotors 30 and 50a in the same manner as described above.

As is understood from the above description, the tightening pattern of the male screw is divided into the initial, interim and final stages as shown in FIG. 3. Thus, the first, second and third rotation speeds of the bit shaft are determined in accordance with the respective stages of the tightening pattern such that the first rotation speed is maintained at a low speed, the second rotation speed is maintained at a higher speed than the first rotation speed and the third rotation speed is maintained at a lower speed than the first rotation speed. Similarly, the first, second and third thrust forces of the feed screw shaft are determined in accordance with the respective stages of the tightening pattern such that the thrust forces are successively increased.

In operation of the screw tightening apparatus, the torque and rotation speed of the servomotors 30 and 50a are controlled in such a manner that at the initial stage of the tightening pattern the bit shaft 50b is rotated at the first rotation speed and moved downward by the first thrust force. With such control of the servomotors 30 and 50a, the male screw 110 is securely brought into engagement with the female screw hole Wa without causing any trouble. Since in the control program the amount of downward movement of the bit shaft per one rotation is calculated at step 203 to determine the initial engagement of the male screw at step 210, it is able to determine the engaged condition of the male screw with high accuracy.

At the interim stage of the tightening pattern, the torque and rotation speed of the servomotors 30 and 50a are controlled in such a manner that the bit shaft 50b is rotated at the second rotation speed and moved downward by the second thrust force. With such control of the servomotors 30 and 50a, the male screw 110 is smoothly threaded into the female screw hole Wa in a short time. At the final stage of the tightening patter, the torque and rotation speed of the servomotors 30 and 50a are controlled in such a manner that the bit shaft 50b is rotated at the third rotation speed and moved downward by the third thrust force. With such control of the servomotors 30 and 50a, the male screw 110 is tightened and seated on the workpiece W in a stable condition. Since in the control program the rotation amount of the bit shaft before seating of the male screw is determined at step 230, the torque for tightening the male screw can be timely increased. Since the rotation speed and torque of the bit shaft are properly controlled in accordance with the respective stages of the tightening pattern as described above, the male screw can be tightened under an optimal thrust force without causing any slip of the distal end of the bit shaft at the male screw head.

During execution of the control program, the computer 80 memorizes the distal end position of the bit shaft 50b as "P1" at step 210a immediately after determined a "Yes" answer at step 210 and memorizes the same as "P2" at step 251 immediately after determined a "Yes" answer at step 250. Subsequently, the computer 80 calculates the amount of downward movement (P2–P1) at step 252 and determines a "No" answer at step 270 until the flag F becomes "1". In this instance, the computer 80 repeats the processing at step 201 to 252 for tightening a plurality of male screws into each female screw hole of plural workpieces and renews a newly calculated amount of downward movement (P2–P1) as the upper and lower limit values Pmax and Pmin respectively at step 291 and 301. When the flag F becomes "1", the computer 80 sets the newly calculated amount of downward movement (P2–P1) as the final target limit values Pmax and Pmin at step 311 and stores them in its back-up memory. When the catcher 50c is supplied with a fresh male screw after the final target limit values Pmax and Pmin have been stored as described above, the computer 80 determines a "Yes" answer at step 270 and determines at step 330 whether or not the supplied fresh male screw has been properly tightened into the corresponding female screw hole. This is useful to inspect a float condition of the male screw threaded into the female screw hole.

Although in the control program the amount of downward movement of the bit shaft per one rotation has been calculated at step 203 to determine the initial engagement of the male screw at step 210, the downward movement speed of the bit shaft 50b may be calculated at step 203 to compare the calculated speed with the downward movement speed of the bit shaft corresponding with the pitch of the male screw at step 210.

Figure 10:
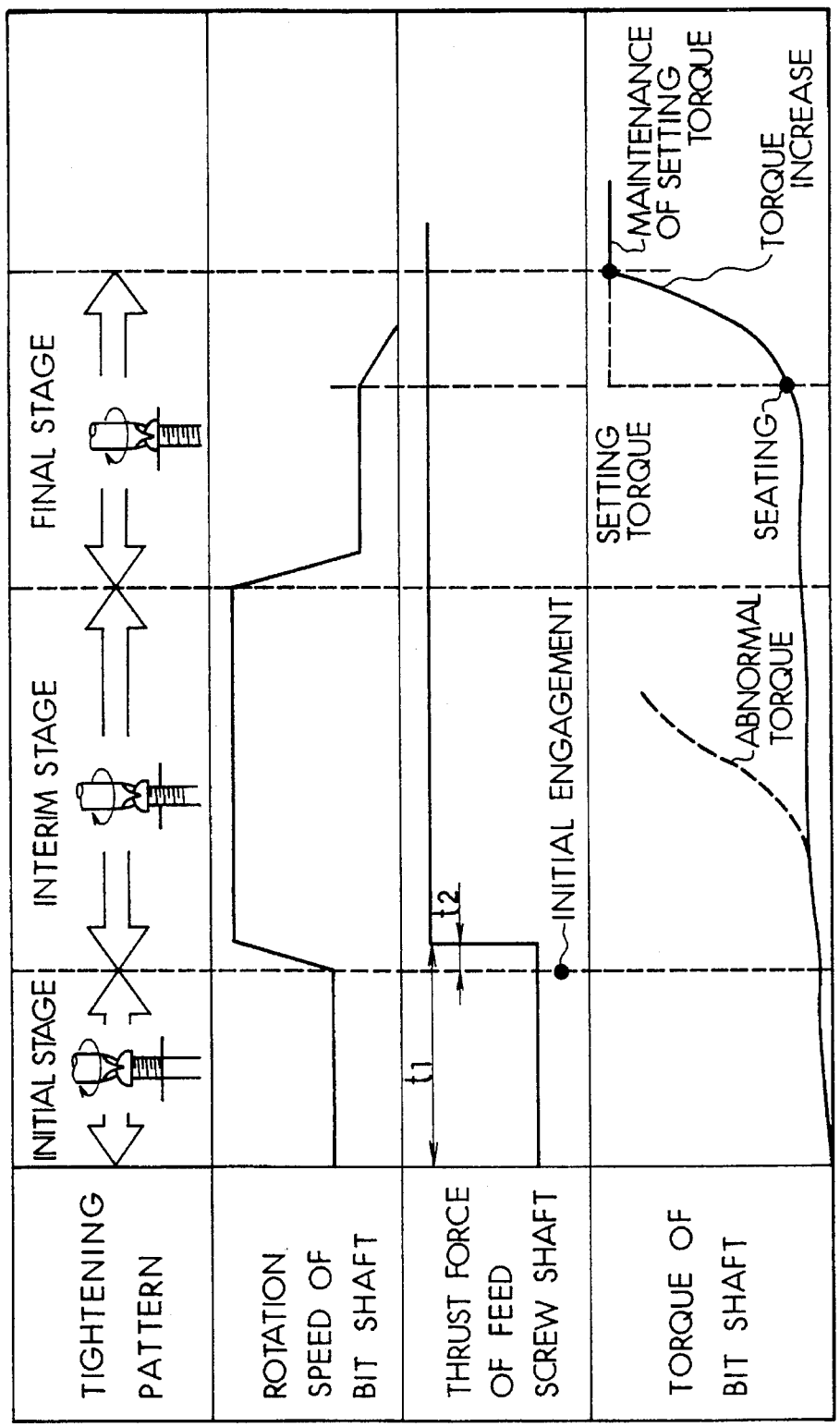
FIG. 10 is a chart showing rotation speed and torque of a bit shaft and a thrust force acting on the bit shaft in relation to a tightening pattern of a male screw.

As shown in FIG. 10, a switch timing controlling when the first thrust force of the screw shaft in the initial stage switches to the second (higher) thrust force of the screw shaft in the interim stage of the tightening pattern may be set when a constant time t2 has passed after the initial engagement of the female hole and male screw without being synchronized with the rotation speed of the shaft. Alternatively, the switch timing may be set when a constant time t1 has passed since the start of the initial stage. When the male screw engages the female screw hole securely with a high engagement force, the male screw may be threaded into the female screw hole with a thrust force equal to the thrust force of the feed screw shaft at the interim stage of the tightening pattern.

Figure 11:
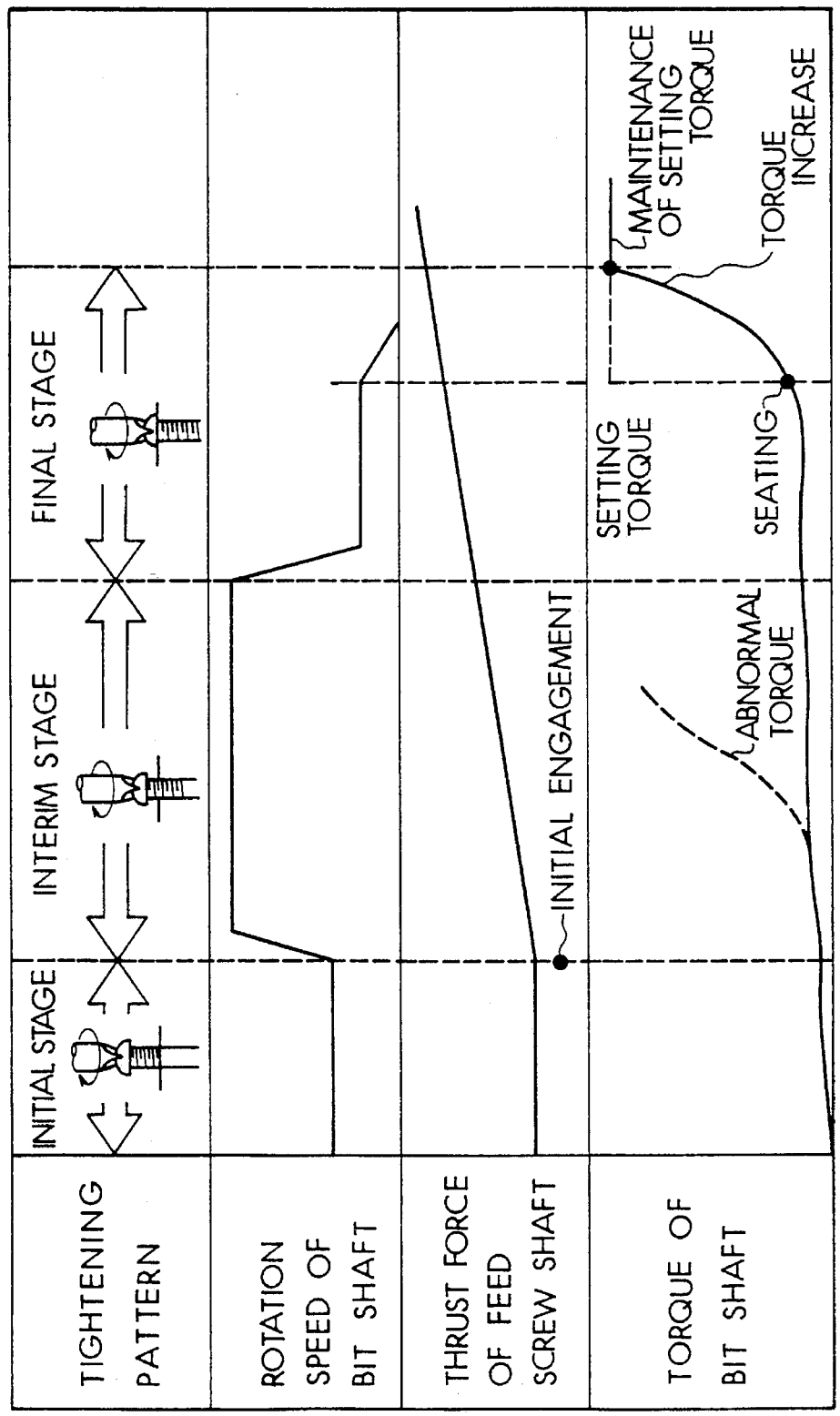
FIG. 11 is a chart showing rotation speed and torque of a bit shaft and a thrust force acting on the bit shaft in relation to a tightening patter of a male screw.
Figure 12:
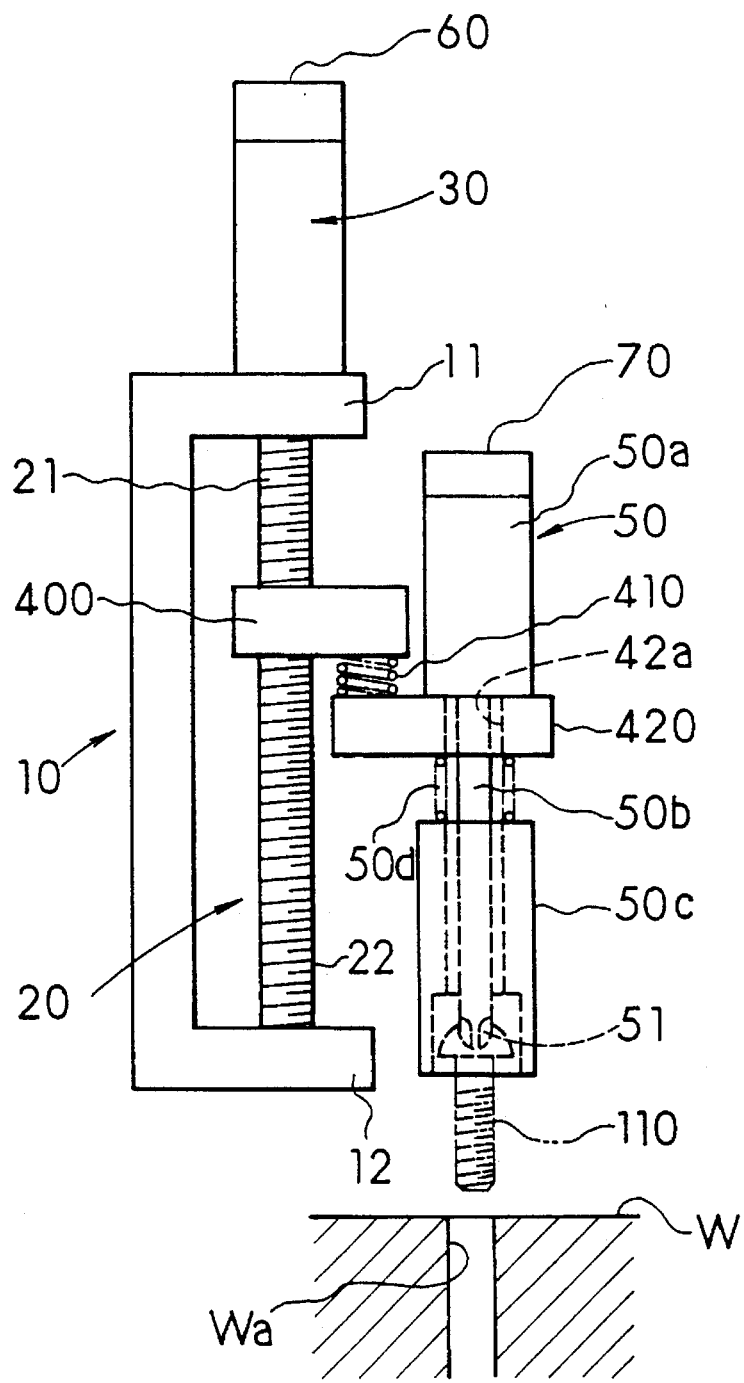
FIG. 12 is a schematic illustration of a screw tightening apparatus.

Oppositely, when the female screw hole, i.e., the workpiece, is made of soft material like resin, etc, the female screw hole can be stripped with an increased thrust force. In this case, the thrust force may be equal to a thrust force at the initial stage and threading action is performed properly. Further, as shown in FIG. 11, the thrust force of the feed screw shaft may be increased gradually to join the male screw and the female screw hole. Since this kind of control gradually increases the necessary torque for tightening, the control is effective for threading a male screw, particularly one having a tapered thread portion, into a female screw hole. A method for gradually increasing the thrust force of the feed screw shaft is to set the thrust force at a desired value randomly by controlling the drive current of the servomotor 30 in FIG. 1. A modified method is shown in FIG. 12. An elastic body 410, such as a spring, is disposed between housing 420 supporting the bit shaft and the support body 400 which is movable up and down along the drive shaft 20. This is one possible way to control the thrust force. For instance, after male screw 110 begins to engage female screw hole Wa, the first drive shaft is slid down with the feed rate per rotation of the bit drive shaft, i.e., the feed rate bigger than the pitch Pn of male screw 110. The downward movement of the support body becomes larger than that of housing 420 and elastic body 410 is contracted. Consequently, the bit shaft receives a thrust force proportional to the contracted amount and receives a continuously increasing thrust force.

Although in the screw tightening apparatus the bit shaft 50b has been directly connected with the servomotor 50a, the bit shaft may be connected with the servomotor 50a through an appropriate speed reduction mechanism. In such a case, it is preferable that sampling of the rotation amount data from the encoder 70 is conducted two times to calculate the rotation amount of the bit shaft based on each interval of the sampling. The calculated rotation amount of the bit shaft is subtracted by the rotation amount of the bit shaft per one rotation to calculate the amount of downward movement of the bit shaft. Alternatively, sampling of the rotation amount data from the encoder 70 may be conducted plural times to calculate the amount of downward movement of the bit shaft 50b per one rotation by a minimum square method.

Although the screw tightening apparatus has been adapted to tighten a male screw into a female screw hole formed in a workpiece, it is to be noted that the screw tightening apparatus may be adapted to mount an object to a male screw that is not movable.

The present invention has been described in connection with what are presently considered the most practical and preferred embodiments of the present invention. However, this invention is not meant to be limited to the disclosed embodiments, but rather is intended to cover all modifications and alternative arrangements included within the spirit and scope of the appended claims.

What is claimed is:

1. A screw tightening apparatus including an electric screwdriver having a bit shaft adapted to carry a male screw to be threaded into a mounting hole of a workpiece and a drive mechanism adapted to move said screwdriver toward and away from said workpiece and to apply a thrust force to said bit shaft of said screwdriver, said screw tightening apparatus also including an electric control system that comprises:

first control means for controlling operation of said screwdriver and said drive mechanism in such a manner that said bit shaft is driven at a first speed and applied with a first thrust force at an initial stage of joining said screw and said workpiece, said initial stage lasting until said male screw is brought into engagement with said mounting hole;

second control means for controlling operation of said screwdriver and said drive mechanism in such a manner that said bit shaft is driven at a second speed higher than said first speed, and has applied thereto a second thrust force which is equal to or larger than said first thrust force during an interim stage where said male screw is threaded into said mounting hole; and third control means for controlling operation of said screwdriver, and said drive mechanism in such a manner that said bit shaft is driven at a third speed less than said first speed and has applied thereto a third thrust force, larger than said first thrust force during a final stage during which said male screw is tightened and seated on said workpiece.

2. A screw tightening apparatus according to claim 1, wherein said electrical control system controls operation of said drive mechanism in such a manner that said third thrust force is set to be larger than said second thrust force.

3. A screw tightening apparatus according to claim 1, further comprising:

means for calculating an amount of downward movement of said bit shaft caused by operation of said drive mechanism in a time period during which said male screw is tightened and seated on said workpiece after engagement with said mounting hole; and means for determining whether the amount of downward movement of said bit shaft is in a predetermined range defined by upper and lower target limit values and for determining that said male screw has been properly tightened when the amount of downward movement of the bit shaft falls in said predetermined range.

4. A screw tightening apparatus according to claim 1, further comprising means for calculating an amount of downward movement of said bit shaft per single rotation and means for determining whether said amount of downward movement of said bit shaft falls within a predetermined range determined by pitch of said male screw and for determining whether said male screw is properly engaged with said mounting hole when the amount of downward movement falls in said predetermined range.

5. A screw tightening apparatus according to claim 1, further comprising means for calculating an advance amount of said male screw into said mounting hole based upon an amount that said male screw has been rotated; and means for determining whether said advance amount is equal to a predetermined amount to seat the male screw on the workpiece and for determining whether torque of said bit shaft is normal if the advance amount is not equal to the predetermined amount.

6. A screw tightening apparatus according to claim 1, further comprising means for determining whether torque of said bit shaft is equal to a set torque; and means for determining whether a rotation amount of sad bit shaft reaches a predetermined reference rotation amount if said torque does not become equal to said set torque and for determining whether there is any error in tightening if said rotation amount fails to reach said predetermined rotation amount.

7. A screw tightening apparatus according to claim 1, wherein said drive mechanism is constructed and arranged such that each said thrust force and the speed of said bit shaft are synchronized and change at respective stages.

8. A screw tightening apparatus according to claim 1, wherein said drive mechanism is constructed and arranged such that said second thrust force during said interim stage is changed after a predetermined time from one for moving said male screw to one where said male screw and said mounting hole are actually joined.

9. A screw tightening apparatus according to claim 1, wherein said drive mechanism is constructed and arranged such that said second thrust force at said interim stage increases gradually for preparing for said final stage.

10. A screw tightener for tightening screws to a workpiece, said tightener comprising:

an electronic screwdriver; and means for driving said screwdriver;

wherein said driving means drives said screwdriver at first rotational speed until each of said screws engages said workpiece;

wherein said driving means imparts a first thrust force to said screwdriver for moving said screw towards said workpiece;

wherein said driving means drives said screw at a second rotation speed, larger than said first rotational speed, as each said screw moves into said workpiece;

wherein said driving means imparts a second thrust force greater than said first thrust force to said screw as said screw moves into said workpiece;

wherein said driving means drives said screw at a third rotation speed less than said first rotational speed during final engagement with said workpiece; and wherein said driving means imparts a third thrust force greater than said second thrust force to said screw during final engagement with said workpiece.

11. An apparatus for joining a screw with a hole in a workpiece, said apparatus comprising:

a support member;

a screwdriver electrically operated so as to follow a predetermined pattern to join said screw to said workpiece;

moving means for moving said screwdriver in a direction parallel to and a direction corresponding to a direction of entry of said screw into said workpiece;

a computer for controlling rotational speed of said screwdriver and for controlling thrust force of said screwdriver; and an elastic body for controlling the thrust force generated by said computer so as to maintain a proper degree of force on screwdriver, said elastic body joining said screwdriver to said support member.

12. An apparatus for joining a screw with a hole in a workpiece according to claim 11:

wherein said computer supplies said apparatus with speed signals governing rotational speed of said screwdriver; and wherein said moving means is controlled by said computer so that a desired thrust force is applied to said screw.

13. An apparatus for joining a screw with a hole in a workpiece as claimed in claim 11, wherein said elastic body contracts and expands so as to impart the proper thrust force to said screwdriver.

14. An apparatus for joining a screw with a hole in a workpiece according to claim 11, wherein said computer includes a driving means, wherein said driving means drives said screwdriver at a first rotational speed until each of said screws engages said workpiece;

wherein said driving means imparts a first thrust force to said screwdriver for moving said screw towards said workpiece;

wherein said driving means drives said screw at a second rotation speed, larger than said first rotational speed, as said screw moves into said workpiece;

wherein said driving means imparts a second thrust force greater than said first thrust force to said screw as said screw moves into said workpiece;

wherein said driving means drives said screw at a third rotation speed less than said first rotational speed during final engagement with said workpiece; and wherein said driving means imparts a third thrust force greater than said second thrust force to said screw during final engagement with said workpiece.

* * * * *